US012650173B1

(12) United States Patent
Popa et al.

(10) Patent No.: US 12,650,173 B1
(45) Date of Patent: Jun. 9, 2026

(54) SEALING ARRANGEMENT

(71) Applicant: Vitesco Technologies GmbH,
Regensburg (DE)

(72) Inventors: Alexandru Popa, Timisoara (RO);
Carsten Mikolajek, Griesheim (DE);
Cosmin Ion Belin, Timisoara (RO);
Dumitru Craciun, Oradea (RO);
Robert-Marian Chitac, Drobeta Turnu
Severin (RO); Mihai Drienovsky,
Timisoara (RO); Deian Rasici,
Timisoara (RO); **Alexandru-Ilie
Isaincu, Dudestii Noi (RO); Denis
Brujan**, Caransebes (RO)

(73) Assignee: Vitesco Technologies GmbH,
Regensburg (DE)

( * ) Notice: Subject to any disclaimer, the term of this
patent is extended or adjusted under 35
U.S.C. 154(b) by 275 days.

(21) Appl. No.: 18/707,283

(22) PCT Filed: Nov. 3, 2022

(86) PCT No.: PCT/EP2022/080614
§ 371 (c)(1),
(2) Date: May 3, 2024

(87) PCT Pub. No.: WO2023/078967
PCT Pub. Date: May 11, 2023

(30) Foreign Application Priority Data

Nov. 5, 2021 (EP) ..................................... 21465561
Nov. 10, 2021 (DE) ..................... 10 2021 212 622.7

(51) Int. Cl.
*F16K 1/226* (2006.01)
*F16K 1/42* (2006.01)
(52) U.S. Cl.
CPC ........... *F16K 1/2263* (2013.01); *F16K 1/427*
(2013.01)

(58) Field of Classification Search
CPC .............................. F16K 1/2263; F16K 1/427
See application file for complete search history.

(56) References Cited

U.S. PATENT DOCUMENTS

| | | | | |
|---|---|---|---|---|
| 3,393,697 A | * | 7/1968 | Fawkes ................. | F16K 1/2263 251/307 |
| 3,744,753 A | * | 7/1973 | Clow, Jr. ............... | F16K 1/2263 251/307 |

(Continued)

FOREIGN PATENT DOCUMENTS

| | | |
|---|---|---|
| DE | 7006387 | 6/1970 |
| DE | 29905744 | 8/1999 |

(Continued)

OTHER PUBLICATIONS

Office Action of corresponding German Patent Application No. DE
10 2021 212 622.7.

(Continued)

*Primary Examiner* — Patrick C Williams
(74) *Attorney, Agent, or Firm* — COZEN O'CONNOR

(57) ABSTRACT

A sealing arrangement for a fluid valve having a housing, a
flap that controls fluid flow, a retaining ring with a contact
portion and a multiplicity of legs, and seal a seal having an
encircling radial web and a first radial surface adjacent to the
radial web, on the upstream side. A first side surface of the
radial web lies against a contact surface of the inner wall of
the housing, the retaining-ring contact portion has a retain-
ing-ring contact provided to lie against a second side surface
of the radial web that is on the downstream side, and free
ends of the multiplicity of legs are provided to be supported
under prestress against a supporting portion of the inner wall
of the housing, extending substantially perpendicular to the
direction of flow of the fluid.

18 Claims, 3 Drawing Sheets

(56)     References Cited

U.S. PATENT DOCUMENTS

| | | | | |
|---|---|---|---|---|
| 3,814,380 | A * | 6/1974 | Kormos | F16K 1/2263 |
| | | | | 251/307 |
| 4,073,473 | A | 2/1978 | Rihm et al. | |
| 4,262,688 | A * | 4/1981 | Bialkowski | F16K 5/0663 |
| | | | | 251/192 |
| 4,676,482 | A * | 6/1987 | Reece | F01L 3/22 |
| | | | | 123/188.8 |
| 4,763,877 | A * | 8/1988 | Kennedy | F16K 1/2263 |
| | | | | 251/306 |
| 7,416,164 | B2 * | 8/2008 | Eggleston | F16K 1/24 |
| | | | | 251/306 |
| 2013/0153803 | A1 | 6/2013 | Adenot et al. | |
| 2014/0353538 | A1 * | 12/2014 | Jeanson | F02B 37/004 |
| | | | | 251/364 |
| 2015/0144826 | A1 * | 5/2015 | Bayyouk | F16K 25/005 |
| | | | | 251/359 |
| 2016/0138719 | A1 | 5/2016 | Kennedy | |
| 2019/0219175 | A1 | 7/2019 | Shu | |

FOREIGN PATENT DOCUMENTS

| | | |
|---|---|---|
| DE | 10204787 | 8/2003 |
| DE | 102010034935 | 2/2011 |
| EP | 0298896 | 5/1991 |
| WO | 2002059510 | 8/2002 |

OTHER PUBLICATIONS

Office Action of corresponding Japanese Patent Application No. 2024-526622, dated Apr. 28, 2025.

* cited by examiner

SEALING ARRANGEMENT

CROSS REFERENCE TO RELATED
APPLICATIONS

This is a U.S. national stage of Application No. PCT/
EP2022/080614 filed Nov. 3, 2022. Priority is claimed on
European Application No. EP 21465561.5 filed Nov. 5, 2021
and German Application No. DE 10 2021 212 622.7 filed
Nov. 10, 2021, the content of which is incorporated herein
by reference.

BACKGROUND OF THE INVENTION

1. Field of the Invention

The present disclosure relates to a sealing arrangement for
use in a fluid valve having a housing and a flap, to a fluid
valve with the sealing arrangement, to a fuel cell arrange-
ment with the fluid valve, to a motor vehicle with the fluid
valve, and to a method for mounting the fluid valve.

2. Description of the Related Art

For blocking gas lines, valve flaps which, for the purpose
of blocking a valve opening, pivot about a central axis in the
valve opening (so-called butterfly valves) or about a lateral
hinge axis onto a valve seat (so-called hinge valves or door
valves) are known from in-house practice.

SUMMARY OF THE INVENTION

It is an object of one aspect of the present invention to
improve a sealing arrangement for use in a fluid valve
having a housing and a flap.

According to one aspect of the present invention, a sealing
arrangement is provided for use in a fluid valve which has
a housing and a flap and which is configured to control a
fluid flow through a valve opening of the fluid valve by
adjusting a position of the flap between a closed position and
an open position. The sealing arrangement here, according
to one embodiment, has a retaining ring with a retaining-
ring contact portion and a multiplicity of legs, and an annular,
flexible seal which has an encircling radial web and a first
radial surface which is adjacent to the radial web, is on the
upstream side during use as intended and which is config-
ured to act as a centering surface for an interference fit with
a corresponding mating centering surface of an inner wall of
the housing, wherein a first side surface of the radial web
that is on the upstream side during use as intended is
provided to lie against a contact surface of the inner wall of
the housing, the retaining-ring contact portion has a retain-
ing-ring contact surface which, during the use as intended,
is provided to lie against a second side surface of the radial
web that is on the downstream side during the use as
intended, and free ends of at least a partial quantity of the
multiplicity of legs are provided, during the use as intended,
to be supported under a prestress against a supporting
portion of the inner wall of the housing, said supporting
portion extending substantially perpendicular to the direc-
tion of flow of the fluid.

What is referred to here as an open position may, in one
aspect, be an (open) end position of the flap. Correspond-
ingly, in one aspect, the valve arrangement or valve opening
is open, or has been opened, completely or to the maximum
extent when the flap is in this open position or open end position. Equally, what is referred to here as an open position
may also be between the closed position and (open) end
position.

In one aspect of the invention, by the use of the combi-
nation of the flexible seal and the retaining ring, the flexible
seal can advantageously be retained firstly by the (radially
acting) compression force, which is produced by the inter-
ference fit between the first radial surface of the annular
radial web and the mating centering surface of the inner wall
of the housing, and secondly by the spring force, which is
produced in the axial direction by the free ends of the legs
of the retaining ring, which free ends are supported under the
prestress on the supporting portion of the inner wall of the
housing. Furthermore, in one embodiment, the seal can
thereby be fixed radially in a simple and cost-effective
manner.

The seal can be produced from a series of flexible
materials, including special low-friction materials, such as
ethylene-propylene-diene rubber (EPDM). In order to
improve the friction properties and thus to improve the
fixing of the seal, the seal can additionally be coated with a
suitable material.

The retaining ring can be or can have been produced, for
example, using a sheet-metal punching method. In one
aspect of the invention, the retaining ring is manufactured
from a cohesive piece of sheet metal, with the legs being
formed by cutting or punching a metal sheet. In this con-
nection, the cutting/punching operations, in one embodi-
ment, are designed in such a manner that they have the
smallest possible width that the respective production
method permits. In this connection, in one embodiment, the
cuts are carried out from the side of the retaining-ring
contact portion in order advantageously to prevent the
formation of sharp edges which could cause damage of the
seal. In one or more embodiments, the legs of the retaining
ring have one or more bends and/or are elastically deform-
able.

In one aspect of the invention, a thickness of the radial
web, as measured in the axial direction of the seal, is
selected, taking into consideration the manufacturing toler-
ances and the influence of thermal effects, in such a manner
that the radial web provides a suitable amount of compres-
sion force/resistance when the retaining-ring contact surface
presses same against the contact surface of the inner wall of
the housing in order to ensure that the free ends of the
(elastic) legs of the retaining ring can return during the
mounting into their original state from a bent state caused by
contact with the inner wall of the housing, in order to be
supported on the supporting portion.

In one aspect of the invention, the seal has an encircling
sealing lip which, during the use as intended, extends in a
direction upstream and in the direction of the inner wall of
the housing, and the inner circumferential surface of which
forms a valve seat which defines the valve opening and
which is provided to be contacted by the flap in the closed
position of the fluid valve.

The seal can thus be divided functionally into two por-
tions, namely, firstly, into an inner portion, which has the
inner circumferential surface of the sealing lip and is
intended for the main sealing function of the valve and for
optimizing the fluid flow over itself, and, secondly, into an
outer mounting portion, which carries out both the function
of the fastening in the flow channel, which is formed by the
housing, for the fluid and also a secondary sealing function.

In one aspect of the invention, a recess is formed between
a portion of the seal that has the first radial surface and the
sealing lip.

3

In one aspect of the invention, the seal, in particular the sealing lip, can be provided with the possibility of expanding elastically in the direction of the inner wall of the housing during a movement of the fluid valve, in particular of the flap for opening/closing the valve opening.

In one aspect of the invention, the recess is configured in such a manner that its base has a rounded portion with a large radius in order to reduce the mechanical stress in this region and thus to increase the service life of the seal. This aspect also permits a difference in pressure between the two sides (upstream side/downstream side) of the valve in order further to increase or to reduce the contact pressure of the sealing lip against the flap, depending on which pressure is higher.

In one aspect of the invention, an upstream end portion of the portion of the seal that has the first radial surface tapers radially inward.

In one aspect of the invention, during the mounting of the fluid valve, insertion of the seal into the portion of the housing having the mating centering surface can be facilitated. Since an interference fit takes place between the first radial surface and the mating centering surface, sealing between the seal and the housing is also ensured.

In one aspect of the invention, the seal has a second radial surface which is adjacent to the radial web, is on the downstream side during use as intended and which is offset inward in the radial direction with respect to the first radial surface. In this case, in one embodiment, the second radial surface extends parallel, or at least substantially parallel, to the direction of flow of the fluid.

In this case, in one aspect of the invention, a downstream end portion of the portion of the seal that has the second radial surface tapers radially inward.

Furthermore, in this case, during the use as intended, in particular the retaining-ring contact portion can be arranged between the second radial surface and the inner wall of the housing, wherein the retaining ring can be arranged spaced apart from the second radial surface.

In one aspect of the invention, the multiplicity of legs extend radially outward via an outer bent portion at an obtuse angle with respect to the (flat) retaining-ring contact portion.

In this connection, the radius of the bent portion can be selected during the production to be larger than specified in order to ensure that the spring effect and the bending take place precisely at the radius. In this case, in particular an outside diameter of the retaining ring that is defined by the free ends of at least the partial quantity of the multiplicity of legs is larger than an inside diameter of a portion of the housing that surrounds the retaining ring in an installed state during the use as intended. Said legs in the installed state are thereby in an elastically deformed state and it can thus be advantageously ensured, in one embodiment, that the ends are supported on the supporting portion under the prestress.

The width of the (bent) legs of the retaining ring is selected depending on the opposing requirements with regard to the resistance to plastic deformation during the mounting and the spring force which acts in the radial direction and serves both for centering the retaining ring and optionally the seal and also for preventing the retaining ring and thus also the seal from being released from the installed position during the operation of the fluid valve.

In one aspect of the invention, one or more of the legs is/are shorter or is/are trimmed in order to provide clamping surfaces which are required for the production process. The shorter legs are selected such that they are distributed uniformly in a circular manner in order to avoid an imbalance in the radial spring force produced by the (longer) legs.

In one aspect of the invention, the retaining ring has an inner bent portion which, during the use as intended, extends substantially in a direction downstream from the retaining-ring contact portion and in particular lies opposite the second radial surface of the radial web.

As a result, in one aspect of the invention, the retaining ring can be increased in rigidity.

In one aspect of the invention, the first side surface and/or the second side surface of the radial web is formed as a structured surface and/or has at least one annular rib.

In one aspect of the invention, the support when pressing against the contact surface of the inner wall of the housing in the axial direction and the tightness in relation to an escape of air from the fluid valve can be ensured by the first side surface of the radial web, and the support during the compression by the retaining-ring contact surface can be ensured by the second side surface.

In one aspect of the present invention, a fluid valve, in particular for a gas line, in particular of a fuel cell and/or a motor vehicle drive, has a housing with an inner wall, and has a flap and a sealing arrangement as previously described, wherein the fluid valve is configured to control a fluid flow through a valve opening of the fluid valve by adjusting a position of the flap between a closed position and an open position, wherein the inner wall of the housing has the mating centering surface, the contact surface and the supporting portion, the first radial surface of the seal lies under a prestress against the mating centering surface, the first side surface of the radial web lies against the contact surface, the retaining-ring contact surface lies against the second side surface of the radial web, and free ends of at least a partial quantity of the multiplicity of legs are supported on the supporting portion under a prestress.

In one aspect of the invention, the seal has the encircling sealing lip, wherein the inner wall has an expanding portion adjoining the mating centering surface upstream, and an outer circumferential surface of the sealing lip is spaced apart from the expanding portion and lies opposite the latter.

In one aspect of the invention, the inner wall has a rectilinear portion which adjoins the expanding portion upstream and extends parallel to the direction of flow of the fluid.

In one aspect of the invention, a clearance for a movement of the sealing lip is advantageously provided. Furthermore, the transitions between the individual portions of the inner wall can be rounded here in order to avoid sharp edges which cause damage.

In one aspect of the invention, the inner wall has a portion which adjoins the mating centering surface downstream and which extends radially outward perpendicular to the direction of flow of the fluid and has the contact surface.

This portion sets the tolerance of the interference fit in the closed position of the flap by the distance to an axis of rotation of the shaft with which the flap is moved.

In one aspect of the invention, the inner wall has a further portion which adjoins the portion, which adjoins the mating centering surface, downstream and which extends parallel to the direction of flow of the fluid, wherein a subsection of the further portion lies opposite an outwardly facing upper side of the radial web and is spaced apart from said upper side.

In one aspect of the invention, a movement of the legs of the retaining ring in the radial direction can be restricted.

In one aspect of the invention, the supporting portion adjoins the further portion downstream, and extends radially inward from the further portion.

In one aspect of the invention, the inner wall has a further, different portion which adjoins the supporting portion downstream and has a first portion, which adjoins the supporting portion and extends parallel to the direction of flow of the fluid, and a second portion which adjoins the first portion and expands.

According to one aspect of the present invention, a fuel cell arrangement, in particular for a motor vehicle drive, has at least one fuel cell, at least one gas line, in particular for supplying gas to, and discharging gas from, the fuel cell, and a fluid valve, as previously described, for blocking the gas line by adjusting the flap into the closed position.

According to one aspect of the present invention, a motor vehicle has at least one fluid valve, as described previously, in particular for blocking a line, in particular gas line, of the motor vehicle, in particular a motor vehicle drive line and/or fuel cell arrangement line, by adjusting the flap into the closed position.

According to one aspect of the present invention, a method for mounting a fluid valve, as described previously, comprises the steps of:

providing the housing having a bore,
   inserting a shaft through the bore,
   introducing the flap from a downstream side of the housing and mounting the flap on the shaft,
   introducing the seal from the downstream side of the housing in such a manner that the first side surface of the radial web lies against the contact surface of the inner wall of the housing, and the first radial surface lies against the mating centering surface of the inner wall of the housing, and
   introducing the retaining ring from the downstream side of the housing in such a manner that the free ends of the at least partial quantity of the multiplicity of legs are bent radially inward elastically during the insertion by contact with the inner wall of the housing and, after passing the supporting portion, snap back radially outward by a spring force of the legs when the retaining ring is pressed with the retaining-ring contact surface against the second side surface of the radial web in such a manner that the radial web is compressed along the direction of flow of the fluid.

BRIEF DESCRIPTION OF THE DRAWINGS

Further advantages and features emerge from the dependent claims and the exemplary embodiments. In this respect, in part schematically:

DETAILED DESCRIPTION OF THE PRESENTLY PREFERRED EMBODIMENTS

Figure 1:
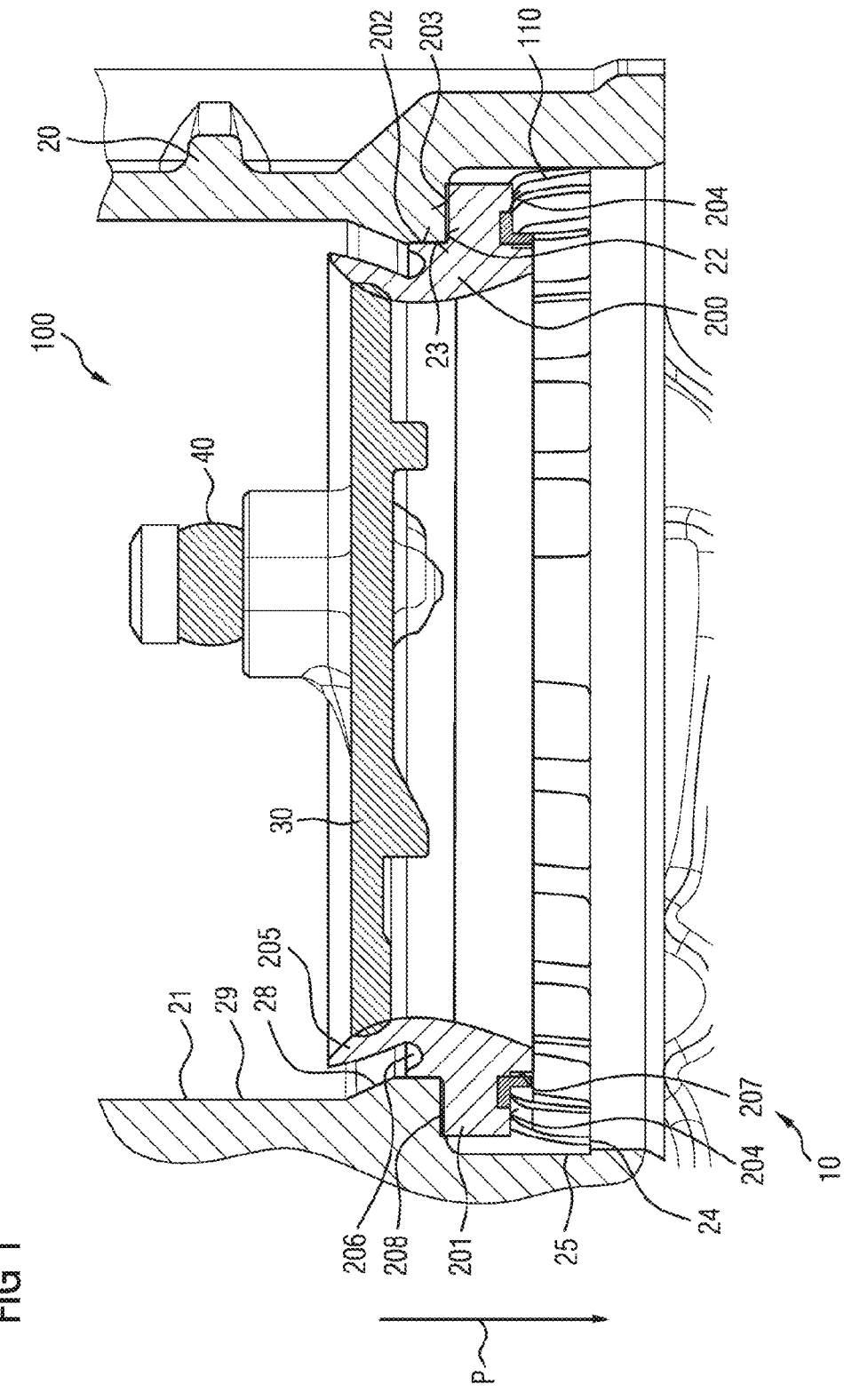
FIG. 1 is a cross-sectional view of a fluid valve with a sealing arrangement.
Figure 2:
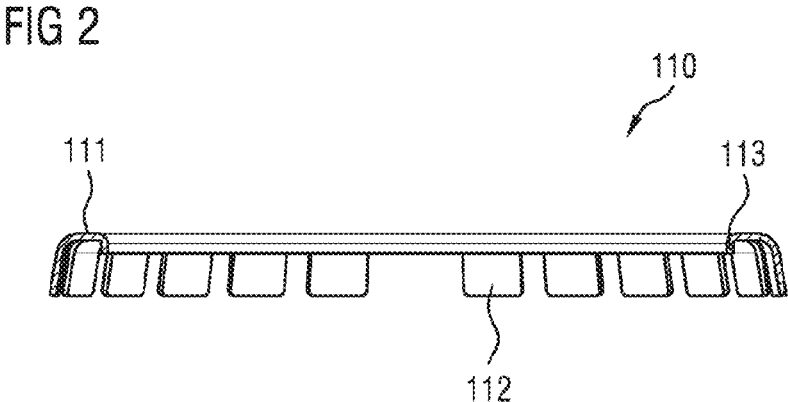
FIG. 2 shows a cross-sectional view of a retaining ring of the sealing arrangement.
Figure 3:
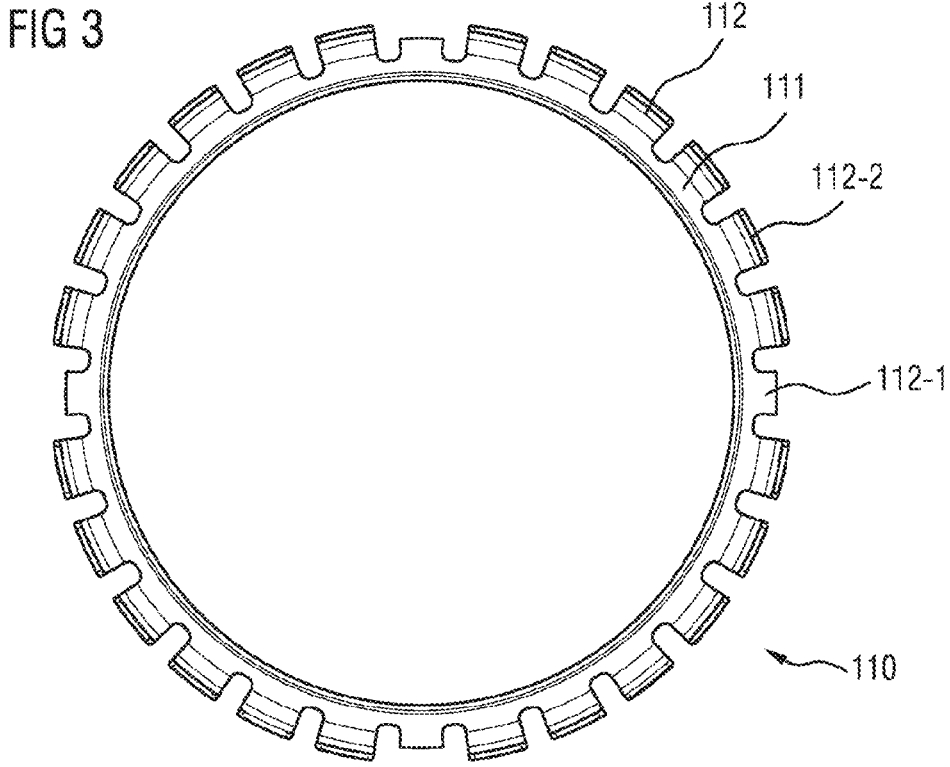
FIG. 3 shows a plan view of the retaining ring shown in FIG. 2.

FIG. 1 shows a fluid valve with a sealing arrangement according to one aspect of the present invention. FIG. 2 shows a cross-sectional view of a retaining ring of the sealing arrangement. FIG. 3 shows a plan view of the retaining ring shown in FIG. 2, and FIG. 4 shows a perspective cross-sectional view of the fluid valve.

Figure 4:
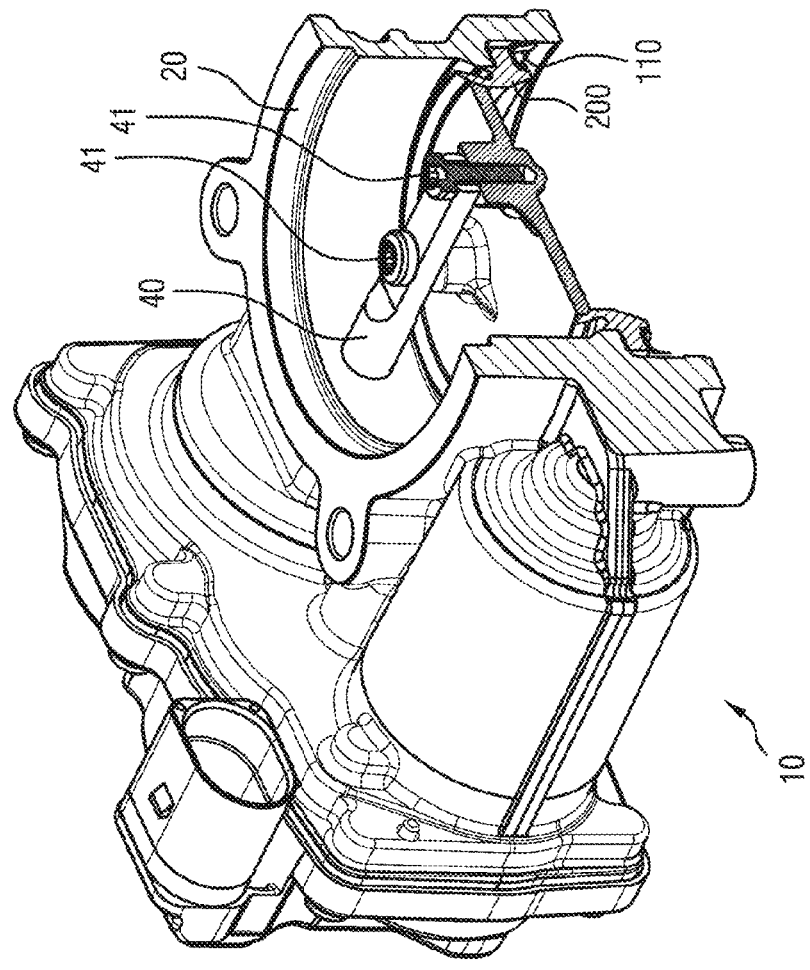
FIG. 4 shows a perspective cross-sectional view of the fluid valve.

The fluid valve 10 has a housing 20, a flap 30 and a sealing arrangement 100 accommodated in the housing 20, and is configured to control a fluid flow of a fluid in a fluid line, in particular gas line, in which the fluid valve 10 is connected or installed, which fluid flows from the top to bottom in FIG. 1, as shown by the arrow P, through a valve opening of the fluid valve 10 by adjusting a position of the flap 30 between a closed position and an open position by a shaft 40 which is connected to the flap 30 by screws 41 and, as shown in FIG. 4, is inserted through a bore of the housing 20.

The sealing arrangement 100 has a retaining ring 110 with a retaining-ring contact portion 111 and a multiplicity of legs 112, and an annular, flexible seal 200 which has an encircling radial web 201 and a first radial surface 202 which is adjacent to the radial web 201, is on the upstream side and which serves as a centering surface for an interference fit with a corresponding mating centering surface 23 of an inner wall 21 of the housing 20.

A first side surface 203 of the radial web 201 that is on the upstream side lies against a contact surface 22 of the inner wall 21 of the housing 20, wherein the retaining-ring contact portion 111 has a retaining-ring contact surface, which lies against a second side surface 204 of the radial web 201 that is on the downstream side, and free ends of at least a partial quantity of the multiplicity of legs 112 are supported under a prestress against a supporting portion 24 of the inner wall of the housing 20, said supporting portion 24 extending substantially perpendicular to the direction of flow P of the fluid.

As shown in particular in figs 1 and 2, the multiplicity of legs 112 extend radially outward at an obtuse angle via an outer bent portion both in the prestressed state (FIG. 1) and in a non-prestressed state (FIG. 2) with respect to the retaining-ring contact portion 111.

Preferably, as shown in FIG. 3, one or more of the legs 112-1 is/are shorter or is/are trimmed in order to provide clamping surfaces which are required for the production process. The arrangement of the shorter legs 112-1 is selected here such that they are distributed uniformly in a circular manner in order to avoid an imbalance in the (radial) spring force produced by the (longer) legs 112-2.

The seal 200 furthermore has an encircling sealing lip 205 which extends in a direction upstream and in the direction of the inner wall 21 of the housing 20, and the inner circumferential surface of which forms a valve seat which defines the valve opening and which is contacted by the flap 30 in the closed position of the fluid valve 10 that is shown in FIG. 1.

A recess 206 is formed here between a portion of the seal 200 that has the first radial surface 202 and the sealing lip 205, wherein an upstream end portion of the portion of the seal 200 that has the first radial surface 202 tapers radially inward.

The inner wall 21 of the housing 20 has an expanding portion 28 adjoining the mating centering surface 23 upstream, wherein an outer circumferential surface of the sealing lip 205 is spaced apart from the expanding portion 28 and lies opposite the latter.

The inner wall 21 of the housing 20 furthermore has a rectilinear portion 29 which adjoins the expanding portion 28 upstream and extends parallel to the direction of flow P of the fluid.

The seal 200 furthermore has a second radial surface 207 which is adjacent to the radial web 201, is on the downstream side and is offset inward in the radial direction with respect to the first radial surface 202. As shown in FIG. 1, in this case, preferably, the first side surface 203 and the second side surface 204 of the radial web 201 are formed as a structured surface and/or have at least one annular rib 208.

The retaining ring 110 has an inner bent portion 113 which, as shown in FIG. 1, extends substantially in a direction downstream from the retaining-ring contact portion 111 and in particular lies opposite the second radial surface 207 of the seal 200.

The inner wall 21 of the housing furthermore has a portion which adjoins the mating centering surface 23 downstream and which extends radially outward perpendicular to the direction of flow P of the fluid and has the contact surface 22 against which the first side surface 203 of the radial web 201 lies.

In addition, the inner wall 21 of the housing has a further portion 25 which adjoins the portion, which adjoins the mating centering surface 23, downstream and which extends parallel to the direction of flow P of the fluid, wherein a subsection of the further portion 25 lies opposite an outwardly facing upper side of the radial web 201 and is spaced apart from said upper side.

The supporting portion 24 adjoins the further portion 25 downstream, and extends radially inward from the further portion 25.

The inner wall 21 of the housing 20 has a further, different portion 26 which adjoins the supporting portion 24 downstream and has a first portion, which adjoins the supporting portion 24 and extends parallel to the direction of flow of the fluid, and a second portion which adjoins the first portion and expands.

For the mounting of the fluid valve 10, first of all a housing 20 having a bore is provided, and the shaft 40 is inserted through the bore into the interior of the housing 20. The flap 30 is then inserted from the downstream side into the interior of the housing 20 until the flap 30 makes contact with a flat surface of the shaft 40. In this state, the flap 30 is centered with the aid of a tool, which is also used later for centering the seal 200, wherein an encircling centering surface of the tool makes contact with the surface of the inner wall 21 of the housing 20.

Two screws 41 are then inserted from the upstream side into the interior of the housing 20, screwed into two screw holes provided for them in the shaft 40 and, after required adjustments have been carried out, are tightened.

The seal 200 is then placed into the housing 20 and pressed into the portion of the housing 20 that is provided for it and that contains the mating centering surface 23 until the upstream (structured) first side surface 203 of the radial web 201 lies against the contact surface 22 of the inner wall 21 of the housing 20. The seal 200 is centered in the housing 20 in this state.

The retaining ring 110 is subsequently inserted from the downstream side into the interior of the housing 20 until the retaining-ring contact surface lies against the downstream second (structured) side surface 204 of the radial web 201. During the mounting, the legs 112 are elastically compressed when the retaining ring 110 is pressed against the radial web 201 of the flexible seal 200, which provides sufficient clearance for the retaining ring 110 to be pushed in further until the free ends of the legs 122 of the retaining ring 110, after passing the supporting portion 24, snap back radially outward by a spring force of the legs 112 when the retaining ring 110 is pressed with the retaining-ring contact surface against the second side surface 204 of the radial web 201 in such a manner that the radial web 201 is compressed along the direction of flow of the fluid.

Although exemplary aspects have been explained in the above description, it should be noted that numerous modifications are possible. Furthermore, it should be noted that the exemplary embodiments are merely examples which are not intended to limit the scope of protection, the applications, and the construction in any way. Instead, the above description gives a person skilled in the art a guideline for the implementation of at least one exemplary embodiment, wherein various changes may be made, especially with regard to the function and arrangement of the component parts described, without departing from the scope of protection as apparent from the claims and combinations of features equivalent thereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A sealing arrangement for use in a fluid valve having:
a housing;
a flap configured to control a fluid flow through a valve opening of the fluid valve by adjusting a position of the flap between a closed position and an open position;
a retaining ring with a retaining-ring contact portion and a multiplicity of legs;
an annular, flexible seal which has an encircling radial web and a first radial surface adjacent to the radial web, arranged on an upstream side during use and configured as a centering surface for an interference fit with a corresponding mating centering surface of an inner wall of the housing, wherein a first side surface of the radial web on an upstream side, during use, is provided to lie against a contact surface of the inner wall of the housing, the retaining-ring contact portion has a retaining-ring contact surface which, during lies against a second side surface of the radial web that is on a downstream side, and free ends of at least a partial quantity of the multiplicity of legs are provided, during use, to be supported under a prestress against a supporting portion of the inner wall of the housing, the supporting portion extending substantially perpendicular to a direction of flow of the fluid.

2. The sealing arrangement as claimed in claim 1, wherein the seal has an encircling sealing lip which, during use, extends in a direction upstream and in towards the inner wall of the housing, and an inner circumferential surface that forms a valve seat which defines the valve opening and provided to be contacted by the flap in the closed position of the fluid valve.

3. The sealing arrangement as claimed in claim 2, in which a recess is formed between a portion of the seal that has the first radial surface and the sealing lip.

4. The sealing arrangement as claimed in claim 3, wherein an upstream end portion of the portion of the seal that has the first radial surface tapers radially inward.

5. The sealing arrangement as claimed in claim 1, wherein the seal has a second radial surface which is adjacent to the radial web, on the downstream side and which is offset inward in a radial direction with respect to the first radial surface.

6. The sealing arrangement as claimed in claim 1, wherein the multiplicity of legs extend radially outward via an outer bent portion at an obtuse angle with respect to the retaining-ring contact portion.

7. The sealing arrangement as claimed in claim 1, wherein the retaining ring has an inner bent portion which, during use, extends substantially in a direction downstream from the retaining-ring contact portion and lies opposite the second radial surface of the radial web.

8. The sealing arrangement as claimed in claim 1, wherein the first side surface and/or the second side surface of the radial web is formed as a structured surface and/or has at least one annular rib.

9. A fuel cell arrangement, in particular for a motor vehicle drive, with at least one fuel cell, at least one gas line, in particular for supplying gas to, and discharging gas from, the fuel cell, and a fluid valve as claimed in claim 1 for blocking the gas line by adjusting the flap into the closed position.

10. A motor vehicle with at least one fluid valve as claimed in claim 1, for blocking a gas line, of the motor vehicle, by adjusting the flap into the closed position.

11. A fluid valve for a gas line of a fuel cell and/or a motor vehicle drive, wherein the fluid valve comprises:

a housing with an inner wall;

a flap; and a sealing arrangement comprising:

a retaining ring with a retaining-ring contact portion and a multiplicity of legs; and an annular, flexible seal which has an encircling radial web and a first radial surface adjacent to the radial web, arranged on an upstream side during use and configured as a centering surface for an interference fit with a corresponding mating centering surface of an inner wall of the housing, wherein a first side surface of the radial web on an upstream side during use is provided to lie against a contact surface of the inner wall of the housing, the retaining-ring contact portion has a retaining-ring contact surface which, during lies against a second side surface of the radial web that is on a downstream side, and free ends of at least a partial quantity of the multiplicity of legs are provided, during use, to be supported under a prestress against a supporting portion of the inner wall of the housing, the supporting portion extending substantially perpendicular to a direction of flow of the fluid;

wherein the fluid valve is configured to control a fluid flow through a valve opening of the fluid valve by adjusting a position of the flap between a closed position and an open position, wherein the inner wall of the housing has the mating centering surface, the contact surface and the supporting portion, the first radial surface of the seal lies under a prestress against the mating centering surface, the first side surface of the radial web lies against the contact surface, the retaining-ring contact surface lies against the second side surface of the radial web, and free ends of at least a partial quantity of the multiplicity of legs are supported on the supporting portion under a prestress.

12. The fluid valve as claimed in claim 11, wherein the seal has an encircling sealing lip, the inner wall has an expanding portion adjoining the mating centering surface upstream, and an outer circumferential surface of the sealing lip is spaced apart from the expanding portion and lies opposite the expanding portion.

13. The fluid valve as claimed in claim 12, wherein the inner wall has a rectilinear portion which adjoins the expanding portion upstream and extends parallel to the direction of flow of the fluid.

14. The fluid valve as claimed in claim 13, in which the inner wall has a portion which adjoins the mating centering surface downstream and which extends radially outward perpendicular to the direction of flow of the fluid and has the contact surface.

15. The fluid valve as claimed in claim 14, wherein the inner wall has a further portion which adjoins the portion, which adjoins the mating centering surface, downstream and which extends parallel to the direction of flow of the fluid, wherein a subsection of the further portion lies opposite an outwardly facing upper side of the radial web and is spaced apart from said upper side.

16. The fluid valve as claimed in claim 15, wherein the supporting portion adjoins the further portion downstream, and extends radially inward from the further portion.

17. The fluid valve as claimed in claim 16, wherein the inner wall has a further, different portion which adjoins the supporting portion downstream and has a first portion, which adjoins the supporting portion and extends parallel to the direction of flow of the fluid, and a second portion which adjoins the first portion and expands.

18. A method for mounting a fluid valve, the fluid valve comprising a housing, a flap, a retaining ring, and an annular, flexible seal, the method comprising:

providing the housing having a bore and an inner wall, inserting a shaft through the bore, introducing the flap from a downstream side of the housing and mounting the flap on the shaft, the flap being configured to control a fluid flow through a valve opening of the fluid valve by adjusting a position of the flap between a closed position and an open position, introducing the annular, flexible seal from the downstream side of the housing, the annular, flexible seal having an encircling radial web and a first radial surface adjacent to the radial web, such that the first radial surface is arranged on an upstream side during use and is configured as a centering surface for an interference fit with a corresponding mating centering surface of the inner wall of the housing, and such that a first side surface of the radial web on the upstream side during use lies against a contact surface of the inner wall of the housing, and introducing the retaining ring from the downstream side of the housing the retaining ring having a retaining-ring contact portion with a retaining-ring contact surface and a multiplicity of legs, such that free ends of at least a partial quantity of the multiplicity of legs are bent radially inward elastically during insertion by contact with the inner wall of the housing and, after passing a supporting portion of the inner wall extending substantially perpendicular to a direction of flow of the fluid, snap back radially outward by a spring force of the legs and the retaining-ring contact surface lies against a second side surface of the radial web that is on a downstream side during use, such that the radial web is compressed along a direction of flow of the fluid.

* * * * *